United States Patent
Li et al.

(10) Patent No.: US 12,187,898 B2
(45) Date of Patent: Jan. 7, 2025

(54) METHOD FOR PRODUCING LOW-COST FULLY BIODEGRADABLE DISPOSABLE STRAW

(71) Applicants: CHINA YUNHONG HOLDINGS CO., LTD., Hubei (CN); Guozhong Xinghe Biomedical Technology Co., Ltd., Hubei (CN); Yunhong Environmental Technology Co., Ltd., Hubei (CN)

(72) Inventors: Yubao Li, Hubei (CN); Jingren He, Hubei (CN); Dong Wu, Hubei (CN); Shuxin Ye, Hubei (CN); Sijia Jiang, Hubei (CN); Rui Zhang, Hubei (CN)

(73) Assignees: CHINA YUNHONG HOLDINGS CO., LTD., Huanggang (CN); Guozhong Xinghe Biomedical Technology Co., Ltd., Huanggang (CN); Yunhong Environmental Technology Co., Ltd., Huanggang (CN)

( * ) Notice: Subject to any disclaimer, the term of this patent is extended or adjusted under 35 U.S.C. 154(b) by 620 days.

(21) Appl. No.: 17/507,774

(22) Filed: Oct. 21, 2021

(65) Prior Publication Data
US 2022/0041865 A1 Feb. 10, 2022

(30) Foreign Application Priority Data
Jun. 22, 2021 (CN) .......................... 202110692236.6

(51) Int. Cl.
| | | |
|---|---|---|
| C08L 97/02 | (2006.01) | |
| A47G 21/18 | (2006.01) | |
| C08L 3/04 | (2006.01) | |
| C08L 5/02 | (2006.01) | |
| C08L 5/16 | (2006.01) | |
| C08L 67/04 | (2006.01) | |

(52) U.S. Cl.
CPC .............. *C08L 97/02* (2013.01); *A47G 21/18* (2013.01); *C08L 3/04* (2013.01); *C08L 5/02* (2013.01); *C08L 5/16* (2013.01); *C08L 67/04* (2013.01); *C08L 2201/06* (2013.01)

(58) Field of Classification Search
None
See application file for complete search history.

(56) References Cited

U.S. PATENT DOCUMENTS 7,931,950 B2   4/2011 Kim et al.

FOREIGN PATENT DOCUMENTS

| CN | 106633370 A | | 5/2017 |
|---|---|---|---|
| CN | 108264776 A | * | 7/2018 |
| CN | 112220319 A | | 1/2021 |
| CN | 112753980 A | * | 5/2021 |

OTHER PUBLICATIONS

CN-108264776-A, English translation (Year: 2018).*
CN-112753980-A, English translation (Year: 2021).*

* cited by examiner

*Primary Examiner* — Stefanie J Cohen

(57) ABSTRACT

A method for producing a low-cost fully biodegradable disposable straw. Natural plant powder is prepared. Deacetylated konjac gel is prepared. The taro starch-cassava starch is crosslinked. The raw material is stirred and mixed to obtain the mixed raw material, and the mixed raw material is heated. The heated raw material is added to the beverage straw manufacturing unit to obtain a straw crude. The straw crude is cut to obtain several straws. The quality inspection, the disinfection and the packaging of the straw are carried out, and the fully biodegradable straw is obtained, finally.

10 Claims, No Drawings

METHOD FOR PRODUCING LOW-COST FULLY BIODEGRADABLE DISPOSABLE STRAW

CROSS-REFERENCE TO RELATED APPLICATIONS

This application claims the benefit of priority from Chinese Patent Application No. 202110692236.6, filed on Jun. 22, 2021. The content of the aforementioned application, including any intervening amendments thereto, is incorporated herein by reference in its entirety.

TECHNICAL FIELD

The application relates to degradable tableware, in particular to a method for producing a low-cost fully biodegradable disposable straw.

BACKGROUND

The existing disposable straws are generally made of polypropylene, polyethylene and other plastic materials, which are not easily degraded, and only a small part can be recycled after being discarded. At present, the disposable straws are mainly treated by burning and landfilling, which will cause serious soil and air pollution.

In this regard, several solutions have been developed to make disposable straws from raw materials such as polylactic acid and paper pulp, but these solutions still has the following problems.

The disposable straw made of polylactic acid can be naturally and rapidly degraded in a variety of ways after being discarded, but its poor thermal resistance and insufficient toughness greatly limit the application of the polylactic acid materials in disposable straws. For the disposable straw made of paper pulp, it requires a large amount of wood pulp to be the raw materials, and its toughness is insufficient as well. Moreover, its preparation process may also cause environmental pollution.

Therefore, it is necessary to develop a fully degradable disposable straw with low cost and desirable performance.

SUMMARY

An object of this disclosure is to provide a method for producing a low-cost fully biodegradable disposable straw, which is made of the fully degradable material. Though the synergistic effect between the deacetylated konjac gel and the taro starch-cassava starch, the straw is provided with desirable mechanical strength and toughness, and the properties of high impact resistance, high thermal resistance, and low cost.

In order to solve the above technical problems, the technical solutions of this disclosure are as follows.

A method for producing a low-cost fully biodegradable disposable straw, comprising:
pulverizing a natural plant material to prepare a natural plant powder;
pulverizing and ultra-fine pulverizing a konjac gel in turn followed by swelling in water under stirring to obtain a swollen konjac gel; and adding water and $Ca(OH)_2$ to the swollen konjac gel followed by stirring to produce a deacetylated konjac gel;
adding water to the taro starch-cassava starch crude product to obtain a starch slurry with a mass fraction of 20%-30%; adding $Na_2SO_4$ to the starch slurry followed by uniform stirring, wherein the $Na_2SO_4$ is 10-20% of a total weight of the taro starch-cassava starch crude product; and adjusting the starch slurry to pH of 10-11 with a 1 mol/L NaOH solution; adding a crosslinker to the starch slurry, wherein the crosslinker is 0.1-1% of the total weight of the taro starch-cassava starch crude product; subjecting the starch slurry to ultrasonic treatment and microwave treatment in a water bath at a temperature of 40-50° C. for 2-3 h; adjusting the starch slurry to pH 5.0-6.5 with 1 mol/L HCl; and washing the starch slurry with distilled water 3-4 times followed by drying in an oven at 45° C. and pulverization to obtain a crosslinked taro starch-cassava starch powder;
mixing 40-60 parts by weight of the crosslinked taro starch-cassava starch powder, 20-30 parts by weight of the deacetylated konjac gel, 5-10 parts by weight of cyclodextrin, 10-20 parts by weight of the natural plant powder, 5-10 parts by weight of a bio-based biodegradable plastic, 0.5-1 part by weight of a stabilizer and 0.5-1 part by weight of a nucleation agent by stirring at 50-80° C. and 800-1000 r/min for 12-20 min to obtain a raw material mixture; and heating the raw material mixture;
feeding the raw material mixture to a beverage straw manufacturing machine followed by extrusion, cooling forming, traction and cutting to obtain a straw crude product, wherein an extrusion temperature is 155-185° C., and an extruder head temperature is 165-200° C.; and cutting the straw crude product into a plurality of sections followed by quality inspection disinfection and packaging to obtain the fully biodegradable disposable straw.

In some embodiments, the ultrasonic treatment is performed at an ultrasonic power of 200-300 W for 0.5-1 h; and the microwave treatment is performed at a microwave power of 200-300 W for 0.5-1 h.

In some embodiments, the crosslinker is selected from the group consisting of sodium trimetaphosphate, sodium tripolyphosphate and a combination thereof.

In some embodiments, the pulverization and ultra-fine pulverization process of the konjac gel is performed through steps of:
subjecting the konjac gel to ball milling for 0.5-1 h followed by pulverization using an ultra-fine pulverizer for 0.5-1 h.

In some embodiments, the natural plant material is pulverized through steps of: pulverizing the natural plant material for 30-45 min using a universal pulverizer followed by ultra-fine pulverization for 15-25 min using an ultra-fine pulverizer.

In some embodiments, a degree of deacetylation of the deacetylated konjac gel is 0.7-1.0, and a weight ratio of the crosslinked taro starch-cassava starch powder to the deacetylated konjac gel is 1.5:1.

In some embodiments, the cyclodextrin is 8% of a total weight of the raw material mixture.

In some embodiments, the bio-based biodegradable plastic comprises a thermoplastic biodegradable plastic.

In some embodiments, the thermoplastic biodegradable plastic is selected from the group consisting of polylactic acid (PLA), polyhydroxyalkanoate (PHA), polybutylene succinate (PBS) and a combination thereof.

In some embodiments, the natural plant powder comprises a natural color-rich plant powder and/or natural fragrance plant powder, and one or more of the natural color-rich plant powder and natural fragrance plant powder contains antibacterial ingredients.

In some embodiments, the stabilizer is selected from the group consisting of ethylene glycol, propylene glycol, maltitol, xylitol, and sorbitan monostearate and a combination thereof.

In some embodiments, the nucleation agent is selected from the group consisting of calcium powder, silicon dioxide, silicate, and ultra-fine talc and a combination thereof.

This disclosure has the following beneficial effects.

The disposable straws in this disclosure can be naturally degraded after being discarded without any pollution to the environment, and its entire preparation process is simple and easy to operate. At the same time, through the synergistic effect between the deacetylated konjac gel and the taro starch-cassava starch, the straw is provided with desirable mechanical strength and toughness, and the properties of high impact resistance, high thermal resistance, water resistance, oil resistance, non-softening, non-deformation, strong plasticity, and low cost; at the same time, the natural plant powder with coloring, fragrance and antibacterial functions is adopted, thereby increasing the antibacterial effect of tableware, at the same time increasing the appeal to consumers, which is conducive to market promotion.

DETAILED DESCRIPTION OF EMBODIMENTS

In order to make the objectives, technical solutions, and advantages of this disclosure clearer, the embodiments of this disclosure will be described in detail as follows.

Embodiment 1

A natural plant material is pulverized to prepare a natural plant powder. In this embodiment, the natural plant powder includes antibacterial ingredients and fragrance ingredients, which can be obtained by one or more of wormwood, medicinal residue of *Scutellaria baicalensis*, honeysuckle vine, coffee grounds powder, *gardenia* fruit powder, red rice powder, *spirulina* powder, and turmeric powder, so as to make the straw contain antibacterial ingredients and be provided with good antibacterial effect. At the same time, it can provide the straw with color and fragrance to increase the appeal to customers. In this embodiment, the natural plant material is pulverized through the following steps. The natural plant material is pulverized for 30-45 min (preferably 40 min) using a universal pulverizer followed by ultra-fine pulverization for 15-25 min (preferably 20 min) using an ultra-fine pulverizer.

A konjac gel is pulverized and ultra-fine pulverized in turn followed by swelling in water under stirring to obtain a swollen konjac gel. And water and $Ca(OH)_2$ are added to the swollen konjac gel followed by stirring to produce a deacetylated konjac gel with a degree of deacetylation of 0.7-1.0. The pulverization and ultra-fine pulverization process of the konjac gel is performed through the following steps. The konjac gel is subjected to ball milling for 0.5-1 h followed by pulverization using an ultra-fine pulverizer for 0.5-1 h.

The crosslinking of the taro starch-cassava starch specifically includes the following steps.

S1. A NaOH solution of 2-3 times the total weight of the taro starch-cassava starch is added to a taro starch-cassava starch mixture followed by mixing, and the mixture is heated at 55-65° C. (preferably 60° C.) for 1.5-2.5 h (preferably 2 h). Then, the mixture is filtered to obtain the taro starch-cassava starch crude. The concentration of the NaOH solution is 0.03-0.1 mol/L.

S2. The taro starch-cassava starch crude product is added with water to obtain a starch slurry with a mass fraction of 20%-30%. The starch slurry is added with $Na_2SO_4$ followed by uniform stirring, in which the $Na_2SO_4$ is 10-20% of a total weight of the taro starch-cassava starch crude product. And the starch slurry is adjusted to pH of 10-11 with a 1 mol/L NaOH solution. The starch slurry is added with a crosslinker, in which the crosslinker is 0.5-1% of the total weight of the taro starch-cassava starch crude product. The starch slurry is subjected to ultrasonic treatment and microwave treatment in a water bath at a temperature of 40-50° C. (preferably 45° C.) for 2-3 h, to assist the modification and promote the crosslinking reaction. The ultrasonic treatment is performed at an ultrasonic power of 200-300 W (preferably 250 W) for 0.5-1 h. And the microwave treatment is performed at a microwave power of 200-300 W (preferably 250 W) for 0.5-1 h. Then the starch slurry is adjusted to pH 5.0-6.5 with 1 mol/L HCl. And the starch slurry is washed with distilled water 3-4 times followed by drying in an oven at 45° C., and pulverization to obtain a crosslinked taro starch-cassava starch powder. Herein, the crosslinker is selected from the group consisting of sodium trimetaphosphate, sodium tripolyphosphate and a combination thereof. And a weight ratio of the crosslinked taro starch-cassava starch powder to the deacetylated konjac gel is 1.5:1.

40 parts by weight of the crosslinked taro starch-cassava starch powder, 20 parts by weight of the deacetylated konjac gel, 10 parts by weight of cyclodextrin, 10 parts by weight of the natural plant powder, 10 parts by weight of a bio-based biodegradable plastic, 0.5 part by weight of a stabilizer and 0.5 part by weight of a nucleation agent are mixed by stirring at 50-80° C. (preferably 70° C.) and 800-1000 r/min for 12-20 min (preferably 15 min) to obtain a raw material mixture. And the raw material mixture is heated. The thermoplastic biodegradable plastic is selected from the group consisting of polylactic acid (PLA), polyhydroxyalkanoate (PHA), polybutylene succinate (PBS) and a combination thereof. The stabilizer is selected from the group consisting of ethylene glycol, propylene glycol, maltitol, xylitol, and sorbitan monostearate and a combination thereof. The nucleation agent is selected from the group consisting of calcium powder, silicon dioxide, silicate, and ultra-fine talc and a combination thereof.

The raw material mixture is fed to a beverage straw manufacturing machine followed by extrusion, cooling forming, traction and cutting to obtain a straw crude product, in which an extrusion temperature is 155-185° C. (165° C.), and an extruder head temperature is 165-200° C. (185° C.).

The straw crude product is cut into a plurality of sections followed by quality inspection disinfection and packaging to obtain the fully biodegradable disposable straw. In this embodiment, the universal pulverizer and the ultra-fine pulverizer are used in turn to pulverize the natural plant powder, then the laser particle size analyzer is used to measure the particle size, the results are shown in Table 1.

TABLE 1

Particle size and distribution of natural plant powder after being pulverized by universal pulverizer and ultra-fine pulverizer

|  | Pulverized by universal pulverizer | Pulverized by universal pulverizer + ultra-fine pulverizer |
|---|---|---|
| Particle size | 25.24 μm | 17.65 μm |
| Particle distribution | 1.17-127 μm | 0.45-59.38 μm |

It can be seen from Table 1 that the natural plant powder, after being merely pulverized by a universal pulverizer, has a relatively wide particle size range, from 1.17 to 127 μm, and the particle size is 25.24 μm, which is relatively large. However, in this embodiment, the natural plant powder after being pulverized by the double pulverization of universal pulverizer+ultra-fine pulverizer, the particle size of which is only 17.65 μm, and the particle size distribution of which is concentrated in 0.45-59.38 μm. More than 95% of the particles are distributed in the range of 2-45 μm. It can be seen that, in this embodiment, after being pulverized by the double pulverization, the particle size of the natural plant powder distinctly decreases, which is beneficial to the release of antibacterial active substances in the natural plant powder.

In this embodiment, the konjac gel is pulverized by a ball mill+ultra-fine pulverizer. The particle size distribution of the pulverized konjac gel is merely 19.82-60.48 μm, and more than 95% were distributed in the range of 40-50 It can be seen that the particle size distribution of the konjac gel is smaller, after the pulverization of ball mill and ultra-fine pulverizer. At the same time, the pulverization by a ball mill+ultra-fine pulverizer can also improve the performance of swelling and viscosity of the konjac gel. The detection process is as follows.

Konjac gel with a mass-volume ratio of 1% is prepared and measured for the viscosity using a digital viscometer in 30° C. water bath. The maximum average is used to calculate the apparent viscosity, the time when the apparent viscosity of the sol reaches the maximum is the full swelling time, and the time when the apparent viscosity of the sol reaches the maximum is the complete swelling time. The results are shown in Table 2.

TABLE 2

Swelling time and apparent viscosity of the konjac gel

| Konjac gel(1%) | Non- pulverized | Pulverized(pulverized by a ball mill for 0.5 h + pulverized by an ultra-fine pulveriazer for 0.5 h) |
|---|---|---|
| Swelling time | 210-240 min | 30-40 min |
| Apparent viscosity | 8.08-8.55 Pa·s | 1.80-4.17 Pa·s |

It can be seen from Table 2 that the swelling time of the non-pulverized konjac gel is 210-240 min, and the apparent viscosity is 8.08-8.55 Pa·s; after being pulverized by a ball mill for 0.5 h and pulverized by an ultra-fine pulverizer for 0.5 h, the swelling time is greatly shortened to 30-40 min, the apparent viscosity drops to 1.80-4.17 Pa·s. It is explained that in this embodiment, the particle size of konjac gel is refined after being pulverized by a ball mill and an ultra-fine pulverizer, the swelling speed of the powder is continuously increased, while the apparent viscosity is reduced, and the swelling time of konjac gel is greatly shortened, which is beneficial to the continuous production of disposable straws.

Furthermore, in this embodiment, the deacetylated konjac gel is prepared by adding $Ca(OH)_2$. Table 3 shows the degree of deacetylation of konjac gel after adding different content of $Ca(OH)_2$.

TABLE 3

Degree of deacetylation of the deacetylated konjac gel under different alkali content

| n (OH—):n (acetyl) | m ($Ca(OH)_2$): m(konjac gel) | Degree of the deacetylation of the deacetylated konjac gel |
|---|---|---|
| 1:8 | 1:1312 | 0.22 ± 0.02 |
| 2:8 | 1:656 | 0.31 ± 0.01 |
| 4:8 | 1:328 | 0.53 ± 0.02 |
| 5:8 | 1:262 | 0.71 ± 0.01 |
| 7:8 | 1:187 | 0.91 ± 0.02 |
| 16:8 | 1:82 | 0.99 ± 0.01 |

It can be seen from Table 3 that different weight ratios of $Ca(OH)_2$ and konjac gel can produce konjac gel with different degrees of deacetylation. In this embodiment, the weight ratio of $Ca(OH)_2$ to konjac gel is 1:(82-260), thereby obtaining konjac gel with a degree of deacetylation of 0.7-1.0.

In this embodiment, the konjac gel, taro starch crude+ cassava starch crude (the weight ratio of the mixture of konjac gel, taro starch crude+cassava starch crude is 1:1) are taken to be mixed uniformly and stirred at 60° C. for 30 min, then cooled to room temperature. The viscosity variation is measured with a rotary viscometer of an NDJ-1 at 60 r/min. The results are shown in Table 4.

TABLE 4

The variations of the viscosity of konjac gel, taro starch crude, and cassava starch crude before and after mixing

| Raw material | Viscosity (mPa · s) |
|---|---|
| Konjac gel | 47 |
| Taro starch crude + cassava starch crude | 30 |
| Konjac gel:(taro starch crude + cassava starch crude) | 201 |

It can be seen from Table 4 that the viscosity of konjac gel mixed with taro starch-cassava starch is much greater than that of konjac gel alone or taro starch-cassava starch alone, indicating that konjac gel has a strong synergistic effect with taro starch-cassava starch.

At the same time, in this embodiment, the crosslinked taro starch-cassava starch, and konjac gel with different degrees of deacetylation are taken to make straws, and the weight ratio of the crosslinked taro starch-cassava starch to the konjac gel with different degrees of deacetylation is set as 1.5:1. The other conditions, such as the addition amount of cyclodextrin (such as 16 parts), natural plant powder (such as 12 parts), crosslinker (such as 0.5 parts), bio-based biodegradable plastic (such as 5 parts), and the extrusion temperature (such as 165° C.) and the extruder head temperature (such as 185° C.), which are set the same. Then the tensile strength, the percentage of breaking elongation, and parameters of water vapor permeability of straws obtained finally are tested. The results are shown in Table 5a.

TABLE 5a

The effect of the degree of deacetylation of konjac gel on the tensile strength, the percentage of breaking elongation, and parameters of water vapor permeability of the straw

| Degree of deacetylation of konjac gel | Tensile strength MPa | Percentage of breaking elongation/% | Parameters of water vapor permeability × 10-11[g · m/(m2 · s · Pa)] |
|---|---|---|---|
| 0 | 2.9 ± 0.2 | 16.5 ± 0.1 | 5.3 ± 0.3 |
| 0.3 | 3.7 ± 0.1 | 18.2 ± 0.2 | 4.5 ± 0.1 |
| 0.5 | 6.2 ± 0.3 | 20.2 ± 0.2 | 4.3 ± 0.3 |
| 0.7 | 12.2 ± 0.1 | 22.8 ± 0.1 | 3.7 ± 0.1 |
| 1.0 | 12.5 ± 0.1 | 22.7 ± 0.3 | 3.5 ± 0.2 |

It can be seen from Table 5a that, with the increase of the degree of deacetylation of deacetylated konjac gel, the tensile strength and the percentage of breaking elongation of the prepared straws increase, and the parameters of water vapor permeability decrease. The reason is that the removal of acetyl groups enhances the hydrophobic performance of the konjac gel, which further affects the mechanical properties of the straw, in this embodiment. At the same time, the straw prepared after deacetylation can well inhibit the permeation of water vapor in the membrane, so that the material is hydrophobic and has a waterproof effect. In summary, in this embodiment, the degree of deacetylation of the deacetylated konjac gel is 0.7-1.0, and the weight ratio of the crosslinked taro starch-cassava starch powder to the deacetylated konjac gel is 1.5:1.

In this embodiment, the effect of the weight proportion of cyclodextrin in the mixed raw material on the tensile strength and percentage of breaking elongation of the straw is also investigated, and the weight proportion gradient of cyclodextrin in the mixed raw material is set to 0%, 5%, 6%, 7%, 8%, 9%, 10%. The other conditions are as follows. The addition amount of the crosslinked taro starch-cassava starch and the deacetylated konjac gel, natural plant powder, bio-based biodegradable plastic are adjusted. The degree of deacetylation of konjac gel (such as 0.7), the extrusion temperature (such as 165° C.), and the extruder head temperature (such as 185° C.) are set to be the same. The test results are shown in Table 5b.

TABLE 5b

Effect of proportion of cyclodextrin on tensile strength and percentage of breaking elongation of the straw

| Addition amount of cyclodextrin | Tensile strength MPa | Percentage of breaking elongation/% |
|---|---|---|
| 0% | 9.8 ± 0.2 | 18.4 ± 0.2 |
| 5% | 10.2 ± 0.3 | 19.6 ± 0.1 |
| 6% | 10.7 ± 0.1 | 20.8 ± 0.1 |
| 7% | 11.4 ± 0.2 | 21.4 ± 0.2 |
| 8% | 12.2 ± 0.1 | 22.8 ± 0.1 |
| 9% | 11.8 ± 0.2 | 22.1 ± 0.3 |
| 10% | 10.9 ± 0.1 | 21.4 ± 0.2 |

It can be seen from the above table that the addition amount of 5%-10% of the cyclodextrin can enhance the tensile strength and percentage of breaking elongation of the straw, both of which shows a trend of increasing and then decreasing. It shows that the appropriate addition of the cyclodextrin can promote the formation of the molecular network structure between the starch and the konjac gel to a certain extent. However, when the addition amount of cyclodextrin exceeds 8%, increasing the addition amount of cyclodextrin will reduce the tensile strength and percentage of breaking elongation. In summary, in this embodiment, it is preferred that the weight ratio of cyclodextrin in the mixed raw material is 8%.

In this embodiment, the taro starch crude and the cassava starch crude are crosslinked (that is, sodium trimetaphosphate and/or sodium tripolyphosphate are added as a crosslinker) to improve its performance parameters. Further, the addition gradient of the crosslinker is set as 0%, 0.01%, 0.5%, 1%, 2% and 3%. The ultrasonic treatment and microwave treatment are carried out in a water bath. The other conditions are the same. The effect of addition amount of crosslinker on pasting temperature, peak viscosity, final viscosity, disintegration value, rebound value, and thermal paste stability is investigated. The results are shown in Table 6

TABLE 6

Effect of addition amount of crosslinker on taro starch crude and cassava starch crude

| Addition amount of crosslinker | Pasting timer/ ° C. | Peak viscosity/ BU | Final viscosity/ BU | Disintegration value/BU | Rebound value/BU | Thermal paste stability/BU |
|---|---|---|---|---|---|---|
| 0% | 76.1 ± 0.2 | 501 ± 1 | 321 ± 1 | 306 ± 1 | 122 ± 1 | 74 ± 1 |
| 0.01% | 76.2 ± 0.1 | 503 ± 2 | 324 ± 2 | 307 ± 1 | 124 ± 2 | 75 ± 2 |
| 0.5% | 78.3 ± 0.2 | 571 ± 1 | 364 ± 1 | 327 ± 2 | 129 ± 1 | 108 ± 3 |
| 1% | 77.4 ± 0.1 | 527 ± 2 | 324 ± 1 | 224 ± 3 | 123 ± 2 | 104 ± 2 |
| 2% | — | — | — | — | — | — |
| 3% | — | — | — | — | — | — |

It can be seen from Table 6 that with the increase of the addition amount of crosslinker, the degree of crosslinking of taro starch crude and cassava starch crude increases, and the peak viscosity shows a trend of rising and then falling, so as to avoid the occurrence of gelatinization. In order to ensure the subsequent shaping and quality of the straw, it is preferable to add a crosslinker of 0.5% of the total weight of the taro starch crude and cassava starch crude to the starch slurry.

In this embodiment, the effect of different addition amount of nucleation agent on the tensile strength, the percentage of breaking elongation of the straw is investigated. The nucleation agent includes calcium powder, silicon dioxide, silicate, and ultra-fine talc, which is prepared by mixing in equal parts. The weight ratio gradient of the nucleation agent in the mixed raw materials is set to 0%, 0.5%, 0.6%, 0.8%, and 0.1%. The other conditions are as follows. The addition amount of crosslinked taro starch-cassava starch, natural plant powder, cyclodextrin, bio-based biodegradable plastic, crosslinker, stabilizer are adjusted. At the same time, the degree of deacetylation of konjac gel (such as 0.7), the extrusion temperature (such as 165° C.), and the extruder head temperature (such as 185° C.) are set to be the same. The test results are shown in Table 7.

TABLE 7

Effect of the proportion of nucleation agent on the tensile strength and percentage of breaking elongation of the straw

| Addition amount of nucleation agent | Tensile strength MPa | Percentage of breaking elongation/% |
|---|---|---|
| 0% | 1.3 ± 0.1 | 10.3 ± 0.1 |
| 0.5% | 3.7 ± 0.2 | 18.1 ± 0.2 |
| 0.6% | 6.3 ± 0.2 | 19.2 ± 0.1 |
| 0.8% | 11.8 ± 0.2 | 19.3 ± 0.3 |
| 0.1% | 12.2 ± 0.1 | 22.8 ± 0.1 |

It can be seen from the above table that the tensile strength and the percentage of breaking elongation of the samples without nucleation agent are relatively low, indicating that the nucleation agent can speed up the crystallization rate, increase the crystal density and promote the micronization of the grain size by changing the crystallization behavior of the raw materials, so as to improve the tensile properties and impact resistance and other physical and mechanical properties of the samples. In summary, in this embodiment, it is preferable that the weight ratio of the nucleation agent is 0.1% in the mixed raw material.

In addition, in this embodiment, the effect of extrusion temperature and extruder head temperature on the vertical load pressure of the straw is also investigated. The temperature gradient of the extrusion is set to 155° C., 165° C., 175° C., 185° C., and 195° C. The corresponding temperature gradient of the extruder head is 165° C., 175° C., 185° C., 195° C., and 200° C. The other conditions are the same. The results are shown in Table 8.

TABLE 8

Effect of extrusion temperature on the vertical load pressure of the straw

| Extrusion temperature/° C. | Extruder head temperature/° C. | Vertical load pressure/N |
|---|---|---|
| 155 | 165 | 95 ± 1 |
| 165 | 175 | 111 ± 2 |
| 175 | 185 | 121 ± 1 |
| 185 | 195 | 73 ± 2 |
| 195 | 200 | 62 ± 1 |

It can be seen from Table 8 that with the increase of the extrusion temperature, extruder head temperature, the vertical load pressure of the straw material shows the trend of increasing and then decreasing. The increasing trend is evident among 155-175° C. When the extrusion temperature exceeds 175° C., the vertical load pressure drops significantly. Therefore, in this embodiment, the extrusion temperature is preferably 175° C., and the extruder head temperature is 185° C.

Embodiment 2

The only difference between this embodiment and Embodiment 1 is that 60 parts by weight of the crosslinked taro starch-cassava starch powder, 30 parts by weight of the deacetylated konjac gel, 10 parts by weight of cyclodextrin, 20 parts by weight of the natural plant powder, 10 parts by weight of a bio-based biodegradable plastic, 1 part by weight of a stabilizer and 1 part by weight of a nucleation agent are prepared. The other steps are the same as in Embodiment 1, and will not be repeated here.

Embodiment 3

The only difference between this embodiment and Embodiment 1 is that 50 parts by weight of the crosslinked taro starch-cassava starch powder, 25 parts by weight of the deacetylated konjac gel, 8 parts by weight of cyclodextrin, 15 parts by weight of the natural plant powder, 7 parts by weight of a bio-based biodegradable plastic, 0.8 part by weight of a stabilizer and 0.8 part by weight of a nucleation agent are prepared. The other steps are the same as in Embodiment 1, and will not be repeated here.

Embodiment 4

The only difference between this embodiment and Embodiment 1 is that 53 parts by weight of the crosslinked taro starch-cassava starch powder, 24 parts by weight of the deacetylated konjac gel, 6 parts by weight of cyclodextrin, 14 parts by weight of the natural plant powder, 6 parts by weight of a bio-based biodegradable plastic, 0.7 part by weight of a stabilizer and 0.6 part by weight of a nucleation agent are prepared. The other steps are the same as in Embodiment 1, and will not be repeated here.

100 straws obtained from each of Embodiments 1-4 are tested for the size deviation, vertical load pressure, immersion resistance, and biodegradability. The results are shown in Table 9.

TABLE 9

Size deviation, vertical load pressure, immersion resistance, and biodegradability of the straw of this disclosure

| Embodiment | Size deviation | Vertical load pressure/N | Notch impact strength/ kJ/m$^2$ | Immersion resistance | Biodegradability |
|---|---|---|---|---|---|
| 1 | Qualified | 98 ± 2 | 8.4 ± 0.3 | Qualified | Qualified |
| 2 | Qualified | 99 ± 3 | 9.1 ± 0.1 | Qualified | Qualified |
| 3 | Qualified | 97 ± 1 | 7.3 ± 0.2 | Qualified | Qualified |
| 4 | Qualified | 97 ± 2 | 7.2 ± 0.1 | Qualified | Qualified |

It can be seen from Table 9 that the fully degradable straws prepared in Embodiments 1-4 of this disclosure are qualified in size deviation, immersion resistance and biodegradability, and the vertical load pressure is above 97%. The notch type of the straw product is A-type notch, whose notch impact strength is above 7.0 kJ/m$^2$.

The biggest disadvantages of thermoplastic biodegradable plastics (such as PLA) are their brittleness and low usage temperature. When the temperature reaches to about 60° C., the ordinary thermoplastic biodegradable plastic products are made to become soft and structurally damaged, thereby limiting the application of the thermoplastic biodegradable plastics in hot food containers and disposable packaging, which also limits their processing conditions.

As mentioned above, through the temperature resistance test of the fully degradable straws prepared in Embodiments 1-4 of this disclosure. The fully degradable straws have passed the hot water test (maintained in hot water at a temperature of 80° C. for 30 min), and none of the test samples shows evident denaturation, peeling and other denaturations, indicating that the product has high temperature resistance. It can be seen that the low-cost biodegradable disposable straw prepared by this disclosure can ensure that the product is strong and heat-resistant in physical properties.

The beneficial effects of this disclosure are as follows. The disposable straw in this disclosure can be naturally degraded after being discarded without any pollution to the environment, and its entire preparation process is simple and easy to operate. At the same time, through the synergistic effect between the deacetylated konjac gel, and the taro starch-cassava starch, the straw is provided with desirable mechanical strength and toughness, and the properties of high impact resistance, high thermal resistance, water resistance, oil resistance, non-softening, non-deformation, strong plasticity.

In the case of no conflict, the above-mentioned embodiments and the features of the embodiments herein can be combined with each other.

The above are only the embodiments of this disclosure and are not intended to limit this disclosure. Any modification, equivalent replacement, improvement made within the spirit and principle of this disclosure shall fall within the scope of the disclosure defined by the appended claims.

What is claimed is:

1. A method for producing a low-cost fully biodegradable disposable straw, comprising:
    pulverizing a natural plant material to prepare a natural plant powder;
    pulverizing and ultra-fine pulverizing a konjac gel in turn followed by swelling in water under stirring to obtain a swollen konjac gel; and adding water and Ca(OH)$_2$ to the swollen konjac gel followed by stirring to produce a deacetylated konjac gel;
    adding a NaOH solution to a taro starch-cassava starch mixture followed by mixing, heating, and filtering to obtain a taro starch-cassava starch crude product;
    adding water to the taro starch-cassava starch crude product to obtain a starch slurry with a mass fraction of 20%-30%; adding Na$_2$SO$_4$ to the starch slurry followed by uniform stirring, wherein the Na$_2$SO$_4$ is 10-20% of a total weight of the taro starch-cassava starch crude product; and adjusting the starch slurry to pH of 10-11 with a 1 mol/L NaOH solution; adding a crosslinker to the starch slurry, wherein the crosslinker is 0.1-1% of the total weight of the taro starch-cassava starch crude product; subjecting the starch slurry to ultrasonic treatment and microwave treatment in a water bath at a temperature of 40-50° C. for 2-3 h; adjusting the starch slurry to pH 5.0-6.5 with 1 mol/L HCl; and washing the starch slurry with distilled water 3-4 times followed by drying in an oven at 45° C. and pulverization to obtain a crosslinked taro starch-cassava starch powder;
    mixing 40-60 parts by weight of the crosslinked taro starch-cassava starch powder, 20-30 parts by weight of the deacetylated konjac gel, 5-10 parts by weight of cyclodextrin, 10-20 parts by weight of the natural plant powder, 5-10 parts by weight of a bio-based biodegradable plastic, 0.5-1 part by weight of a stabilizer and 0.5-1 part by weight of a nucleation agent by stirring at 50-80° C. and 800-1000 r/min for 12-20 min to obtain a raw material mixture; and heating the raw material mixture;
    feeding the raw material mixture to a beverage straw manufacturing machine followed by extrusion, cooling forming, traction and cutting to obtain a straw crude product, wherein an extrusion temperature is 155-185° C., and an extruder head temperature is 165-200° C.; and
    cutting the straw crude product into a plurality of sections followed by quality inspection disinfection and packaging to obtain the low-cost fully biodegradable disposable straw.

2. The method of claim 1, wherein the ultrasonic treatment is performed at an ultrasonic power of 200-300 W for 0.5-1 h; and the microwave treatment is performed at a microwave power of 200-300 W for 0.5-1 h.

3. The method of claim 1, wherein the crosslinker is selected from the group consisting of sodium trimetaphosphate, sodium tripolyphosphate and a combination thereof.

4. The method of claim 1, wherein the pulverization and ultra-fine pulverization process of the konjac gel is performed through steps of:
    subjecting the konjac gel to ball milling for 0.5-1 h followed by pulverization using an ultra-fine pulverizer for 0.5-1 h.

5. The method of claim 1, wherein the natural plant material is pulverized through steps of:
    pulverizing the natural plant material for 30-45 min using a universal pulverizer followed by ultra-fine pulverization for 15-25 min using an ultra-fine pulverizer.

6. The method of claim 1, wherein a degree of deacetylation of the deacetylated konjac gel is 0.7-1.0, and a weight ratio of the crosslinked taro starch-cassava starch powder to the deacetylated konjac gel is 1.5:1.

7. The method of claim 1, wherein the cyclodextrin is 8% of a total weight of the raw material mixture.

8. The method of claim 1, wherein the bio-based biodegradable plastic comprises a thermoplastic biodegradable plastic.

9. The method of claim 8, wherein the thermoplastic biodegradable plastic is selected from the group consisting of polylactic acid (PLA), polyhydroxyalkanoate (PHA), polybutylene succinate (PBS) and a combination thereof.

10. The method of claim 1, wherein the natural plant powder comprises a natural color-rich plant powder and/or a natural fragrance plant powder.

* * * * *